United States Patent
Fraher et al.

(10) Patent No.: US 8,694,424 B2
(45) Date of Patent: Apr. 8, 2014

(54) SYSTEM AND METHOD FOR MANAGING FOREIGN PAYMENTS USING SEPARATE MESSAGING AND SETTLEMENT MECHANISMS

(75) Inventors: Richard M. Fraher, Marietta, GA (US); Larry Schulz, Atlanta, GA (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 1062 days.

(21) Appl. No.: 12/002,917

(22) Filed: Dec. 18, 2007

(65) Prior Publication Data

US 2009/0157550 A1     Jun. 18, 2009

(51) Int. Cl.
*G06Q 40/00* (2012.01)

(52) U.S. Cl.
USPC .............................................. 705/39; 705/40

(58) Field of Classification Search
USPC ...................................... 705/39, 40
See application file for complete search history.

(56) References Cited

U.S. PATENT DOCUMENTS

| | | | |
|---|---|---|---|
| 4,270,042 A | 5/1981 | Case | |
| 4,727,243 A | 2/1988 | Savar | |
| 4,823,264 A | 4/1989 | Deming | |
| 5,121,945 A | 6/1992 | Thomson et al. | |
| 5,175,682 A | 12/1992 | Higashiyama et al. | |
| 5,448,043 A | 9/1995 | Nakano et al. | |
| 5,532,464 A | 7/1996 | Josephson et al. | |
| 5,691,524 A | 11/1997 | Josephson | |
| 5,717,868 A | 2/1998 | James | |
| 5,742,819 A | 4/1998 | Caccavale | |
| 5,761,510 A | 6/1998 | Smith, Jr. et al. | |
| 5,783,808 A | 7/1998 | Josephson | |
| 5,787,402 A * | 7/1998 | Potter et al. | 705/37 |
| 5,790,778 A | 8/1998 | Bush et al. | |
| 5,794,234 A | 8/1998 | Church et al. | |
| 5,825,003 A | 10/1998 | Jennings et al. | |
| 5,848,400 A | 12/1998 | Chang | |
| 5,852,812 A | 12/1998 | Reeder | |
| 5,903,878 A | 5/1999 | Talati et al. | |
| 5,940,813 A | 8/1999 | Hutchings | |
| 5,946,669 A | 8/1999 | Polk | |
| 5,956,700 A | 9/1999 | Landry | |

(Continued)

FOREIGN PATENT DOCUMENTS

WO    WO0030053    5/2000

OTHER PUBLICATIONS

"Fixed-to-Fixed Foreign Exchange (F3x) Pilot Overview"; Dec. 18-19, 2006.

(Continued)

*Primary Examiner* — Justin M Pats
*Assistant Examiner* — Benjamin S Fields
(74) *Attorney, Agent, or Firm* — King & Spalding LLP (57) ABSTRACT

Managing foreign payments using separate conduits for messaging and payments. An originating depository financial institution can create an F3X message designating a fixed amount of foreign currency to be credited to, or debited from, a receiving depository financial institution. The originating depository financial institution transmits the F3X message to a domestic gateway operator via an ACH network. The domestic gateway operator then forwards the F3X message to a foreign gateway operator. Separately, the originating depository financial institution transmits a payment to the foreign gateway operator either directly or via a correspondent financial institution. The foreign gateway operator matches the payment to the F3X message and transmits the payment to the receiving depository financial institution.

22 Claims, 9 Drawing Sheets

(56) References Cited

U.S. PATENT DOCUMENTS

| | | | |
|---|---|---|---|
| 5,963,647 A | 10/1999 | Downing et al. |
| 5,963,648 A | 10/1999 | Rosen |
| 5,978,485 A | 11/1999 | Rosen |
| 6,026,379 A | 2/2000 | Haller et al. |
| 6,032,133 A | 2/2000 | Hilt et al. |
| 6,061,665 A | 5/2000 | Bahreman |
| 6,076,064 A | 6/2000 | Rose, Jr. |
| 6,076,074 A | 6/2000 | Cotton et al. |
| 6,098,053 A | 8/2000 | Slater |
| 6,119,107 A | 9/2000 | Polk |
| 6,141,651 A | 10/2000 | Riley et al. |
| 6,173,272 B1 | 1/2001 | Thomas et al. |
| 6,205,433 B1 | 3/2001 | Boesch et al. |
| 6,216,115 B1 | 4/2001 | Barrameda et al. |
| 6,243,689 B1 | 6/2001 | Norton |
| 6,246,999 B1 | 6/2001 | Riley et al. |
| 6,269,345 B1 | 7/2001 | Riboud |
| 6,304,860 B1 | 10/2001 | Martin, Jr. et al. |
| 6,317,745 B1 | 11/2001 | Thomas et al. |
| 6,408,284 B1 | 6/2002 | Hilt et al. |
| 6,598,028 B1 | 7/2003 | Sullivan et al. |
| 6,615,258 B1 | 9/2003 | Barry et al. |
| 6,629,081 B1 | 9/2003 | Cornelius et al. |
| 6,721,715 B2 | 4/2004 | Nemzow |
| 6,754,640 B2 | 6/2004 | Bozeman |
| 6,829,590 B1 | 12/2004 | Greener et al. |
| 6,856,970 B1 | 2/2005 | Campbell et al. |
| 6,868,408 B1 | 3/2005 | Rosen |
| 6,873,972 B1 | 3/2005 | Marcial et al. |
| 6,892,184 B1 | 5/2005 | Komem |
| 7,269,575 B1* | 9/2007 | Concannon et al. ............ 705/39 |
| 7,330,835 B2 | 2/2008 | Deggendorf |
| 7,333,953 B1 | 2/2008 | Banaugh et al. |
| 2001/0034682 A1 | 10/2001 | Knight et al. |
| 2001/0034702 A1 | 10/2001 | Mockett et al. |
| 2002/0016769 A1 | 2/2002 | Barbara et al. |
| 2002/0029194 A1 | 3/2002 | Lewis et al. |
| 2002/0032642 A1 | 3/2002 | Chichilnisky |
| 2002/0035561 A1 | 3/2002 | Archer et al. |
| 2002/0038305 A1 | 3/2002 | Bahl et al. |
| 2002/0055904 A1 | 5/2002 | Mon |
| 2002/0072942 A1 | 6/2002 | Kuykendall et al. |
| 2002/0077971 A1 | 6/2002 | Allred |
| 2002/0082962 A1 | 6/2002 | Farris et al. |
| 2002/0087455 A1 | 7/2002 | Tsagarakis et al. |
| 2002/0099656 A1 | 7/2002 | Poh Wong |
| 2002/0120537 A1 | 8/2002 | Morea et al. |
| 2002/0120846 A1 | 8/2002 | Stewart et al. |
| 2002/0161692 A1 | 10/2002 | Loh et al. |
| 2002/0161707 A1 | 10/2002 | Cole et al. |
| 2002/0185529 A1 | 12/2002 | Cooper et al. |
| 2003/0018554 A1 | 1/2003 | Lyftogt et al. |
| 2003/0024979 A1 | 2/2003 | Hansen et al. |
| 2003/0033228 A1 | 2/2003 | Bosworth-Davies et al. |
| 2003/0050892 A1 | 3/2003 | Clynes et al. |
| 2003/0055756 A1 | 3/2003 | Allan |
| 2003/0065594 A1 | 4/2003 | Murphy |
| 2003/0065941 A1 | 4/2003 | Ballard et al. |
| 2003/0070080 A1 | 4/2003 | Rosen |
| 2003/0105710 A1 | 6/2003 | Barbara et al. |
| 2003/0126094 A1 | 7/2003 | Fisher et al. |
| 2003/0144942 A1 | 7/2003 | Sobek |
| 2003/0158811 A1 | 8/2003 | Sanders et al. |
| 2003/0167223 A1 | 9/2003 | Pledereder et al. |
| 2003/0167237 A1 | 9/2003 | Degen et al. |
| 2003/0177087 A1 | 9/2003 | Lawrence |
| 2003/0182227 A1 | 9/2003 | Guzman |
| 2003/0187783 A1 | 10/2003 | Arthus et al. |
| 2003/0187792 A1 | 10/2003 | Hansen et al. |
| 2003/0208439 A1 | 11/2003 | Rast |
| 2003/0208440 A1 | 11/2003 | Harada et al. |
| 2003/0208445 A1 | 11/2003 | Compiano |
| 2003/0220878 A1 | 11/2003 | Degen et al. |
| 2003/0229586 A1 | 12/2003 | Repak |
| 2003/0233319 A1 | 12/2003 | Lawrence |
| 2004/0002914 A1 | 1/2004 | Munro |
| 2004/0006533 A1 | 1/2004 | Lawrence |
| 2004/0024709 A1 | 2/2004 | Yu et al. |
| 2004/0030621 A1 | 2/2004 | Cobb |
| 2004/0034594 A1 | 2/2004 | Thomas et al. |
| 2004/0078328 A1 | 4/2004 | Talbert et al. |
| 2004/0078332 A1 | 4/2004 | Ferguson et al. |
| 2004/0083167 A1 | 4/2004 | Kight et al. |
| 2004/0093305 A1 | 5/2004 | Kight et al. |
| 2004/0109596 A1 | 6/2004 | Doran |
| 2004/0117299 A1 | 6/2004 | Algiene et al. |
| 2004/0128240 A1 | 7/2004 | Yusin |
| 2004/0138973 A1 | 7/2004 | Keis et al. |
| 2004/0143621 A1 | 7/2004 | Fredrickson et al. |
| 2004/0148225 A1 | 7/2004 | Olafsson |
| 2004/0153403 A1 | 8/2004 | Sadre |
| 2004/0199463 A1 | 10/2004 | Deggendorf |
| 2004/0205011 A1 | 10/2004 | Northington et al. |
| 2004/0236646 A1 | 11/2004 | Wu et al. |
| 2005/0004872 A1* | 1/2005 | Gavin et al. ...................... 705/42 |
| 2005/0021454 A1* | 1/2005 | Karpovich et al. ............. 705/39 |
| 2005/0038743 A1 | 2/2005 | Stanley et al. |
| 2005/0044043 A1 | 2/2005 | Gooding et al. |
| 2005/0086136 A1 | 4/2005 | Love et al. |
| 2005/0167481 A1 | 8/2005 | Hansen et al. |
| 2005/0177464 A1 | 8/2005 | Komem et al. |
| 2005/0209961 A1 | 9/2005 | Michelsen et al. |

OTHER PUBLICATIONS

"Fixed-to-Fixed Foreign Exchange (F3x) Pilot Overview"; Oct. 25, 2007.

U.S. Appl. No. 60/416,663, filed Oct. 7, 2002, Yusin.

Eurogiro, Development of Interface Between FED and Eurogiro, Request for Proposal, Jan. 14, 2003, Uwe Holmsgaard, Eurogiro Network A/S.

Fedline User Guide. ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System. Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH[SM] Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC). Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pp. 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

PC AIMS User's Guide, Credit Controls, pp. 10-1 to 10-8, Feb. 25, 2002.

(56) References Cited

OTHER PUBLICATIONS

EPN Voice Response System (RALPH). Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

* cited by examiner

| Forward Item Five Record – Company Batch Header | | | | | |
|---|---|---|---|---|---|
| (Column four notes R = Required, M= Mandatory or O = Optional field designation.) | | | | | |
| Field No. | Position | Field Size | Req. | Contents | Explanation |
| 01 | 01-01 | 1 | M | Record Type Code | Insert '5' always. |
| 02 | 02-04 | 3 | M | Service Class Code | Insert '220' - for credits only. |
| 03 | 05-20 | 16 | M | Company Name | Insert originating company name. |
| 04 | 21-22 | 2 | R | Foreign Exchange Indicator | Insert FF (fixed-to-fixed). |
| 05 | 23-23 | 1 | R | Foreign Exchange Reference Indicator | The following codes indicate content of the Foreign Exchange Reference Field 6 below: 1 for foreign exchange rate, 2 for foreign exchange reference number or 3 for space filled. |
| 06 | 24-38 | 15 | R | Foreign Exchange Reference | Foreign exchange rate used or another reference to the foreign exchange transaction. If 3 is used in foreign exchange reference indicator field, this field must be space filled. |
| 07 | 39-40 | 2 | R | ISO² Destination Country Code | Insert MX for Mexico. |
| 08 | 41-50 | 10 | M | Company Identification | Assigned by the ODFI for each customer. |

| Forward Item Five Record – Company Batch Header | | | | | |
|---|---|---|---|---|---|
| (Column four notes R = Required, M= Mandatory or O = Optional field designation.) | | | | | |
| Field No. | Position | Field Size | Req. | Contents | Explanation |
| 09 | 51-53 | 3 | M | Standard Entry Class Code | Insert CBR or PBR. |
| 10 | 54-63 | 10 | M | Company Entry Description | See Appendix IV for specifications. |
| 11 | 64-66 | 3 | R | ISO Originating Currency Code | Insert MXN. |
| 12 | 67-69 | 3 | R | ISO Destination Currency Code | Insert MXN for Mexican peso. |
| 13 | 70-75 | 6 | R | Effective Entry Date | Insert 'YYMMDD' (the due/settlement date of the payment). |
| 14 | 76-78 | 3 | M | Settlement Date (Julian) | Leave Blank. Inserted by the Operator. |
| 15 | 79-79 | 1 | M | Originator Status Code | Insert '1' always. |
| 16 | 80-87 | 8 | M | Originating DFI Identification | Insert ABA number of the ODFI. |
| 17 | 88-94 | 7 | M | Batch Number | Start at the ODFI designated number. |

Fig. 5A

| Forward Item Six Record - Entry Detail Record ||||||
|---|---|---|---|---|---|
| Field No. | Position | Field Size | Req. | Contents | Explanation |
| 01 | 01-01 | 1 | M | Record Type Code | Insert '6' always. |
| 02 | 02-03 | 2 | M | Transaction Code | Insert '23' - Prenotification of checking account Authorization (non-dollar).<br><br>Note: countries other than the U.S. do not support pre-notes. |
| 03 | 04-11 | 8 | M | Receiving DFI Identification | Insert '0910-5070-0' (Banxico's ABA number). |
| 04 | 12-12 | 1 | M | Check Digit | Combined with field 03 above. |
| 05 | 13-29 | 17 | R | DFI Account No. (Receiver's Account Number) | Insert the account number of the foreign receiver:<br>• first 17 digits of CLABE or<br>• 16-digit debit card account number.<br>Banxico will not validate |

| Forward Item Six Record - Entry Detail Record ||||||
|---|---|---|---|---|---|
| Field No. | Position | Field Size | Req. | Contents | Explanation |
| | | | | | this field. |
| 06 | 30-39 | 10 | M | Amount (U.S.$) | Zero-filled |
| 07 | 40-54 | 15 | O | Company (CBR) or Individual (PBR) Identification No. | Insert customer reference or individual number, which must be either left justified or space filled. |
| 08 | 55-76 | 22 | R | Company (CBR) or Individual (PBR) Name | Entered by the Originator, this field provides additional identification for the receiver (i.e., customer name).<br><br>Note: Banxico edits for the presence of characters in this field and will return items that do not contain characters. |
| 09 | 77-78 | 2 | O | Discretionary Data | This is an optional field. |
| 10 | 79-79 | 1 | M | Addenda Record Indicator | Insert '1' always.<br>This indicates there is a 7 record (see the following page). |
| 11 | 80-94 | 15 | M | Trace Number | Assigned by the ODFI. |

Fig. 5B

| Forward Item Seven Record – Addenda Record |||||
|---|---|---|---|---|
| Field No. | Position | Field Size | Req. | Contents | Explanation |
| 01 | 01-01 | 1 | M | Record Type Code | Insert '7' always. |
| 02 | 02-03 | 2 | M | Addenda Type Code | Insert '01' always |
| 03 | 04-06 | 3 | R | Transaction Type Code | Insert type of payment: 'ANN' for Annuity, 'BUS' for Business to Business, 'DEP' for Deposit, 'LOA' for Loan, 'MIS' for Miscellaneous, 'MOR' for Mortgage, 'PEN' for Pension, 'RLS' for Rent/Lease, 'SAL' for Salary/Payroll or 'TAX' for Tax. |
| 04 | 07-17 | 11 | R | Foreign Receiving DFI Identification | Insert the foreign RDFI's 3 digit participant number. |

| Forward Item Seven Record – Addenda Record |||||
|---|---|---|---|---|
| Field No. | Position | Field Size | Req. | Contents | Explanation |
| 05 | 18-32 | 15 | R | Foreign Payment Amount | Insert the peso amount of payment |
| 06 | 33-54 | 22 | O | Foreign Trace Number | Insert blanks or zeros. |
| 07 | 55-79 | 25 | R | Foreign Receiver's Account Number | Insert the account number of the Foreign Receiver: <br>• either the CLABE (18-digits) or, <br>• the debit card account number (16-digits). |
| 08 | 80-94 | 15 | M | Trace Number | Assigned by the ODFI. (Must be the same as the preceding '6' record.) |

| Forward Item Eight Record – Batch Control Record (Same as Domestic Batch Control Record, except for field 6) |||||
|---|---|---|---|---|
| Field No. | Position | Field Size | Req. | Contents | Explanation |
| 06 | 33-44 | 12 | M | Total Credit Entry Dollar Amount | Zero-filled |

Fig. 5C

SYSTEM AND METHOD FOR MANAGING FOREIGN PAYMENTS USING SEPARATE MESSAGING AND SETTLEMENT MECHANISMS

RELATED APPLICATION

The present patent application is related to U.S. patent application Ser. No. 11/224,380, entitled "Managing Foreign Exchange in an International ACH," filed Sep. 12, 2005.

FIELD OF THE INVENTION

The invention relates generally to managing foreign payments in an International low value, non-urgent payment system, and more particularly to managing fixed to fixed payments using separate messaging and settlement conduits.

BACKGROUND OF THE INVENTION

Financial institutions in the U.S. are increasingly clearing financial transactions using electronic systems such as the Automated Clearinghouse ("ACH") network. In the U.S., the ACH network is a nationwide electronic funds transfer system supported by several operators, including the Federal Reserve Banks and other institutions. The U.S. ACH network is governed by a set of rules, which are administered by the National Automated Clearinghouse Association ("NACHA"). Financial institutions collect financial transactions and package them in batched ACH files, according to the NACHA rules, for forwarding to other institutions. Typically, the financial transactions are bundled as ACH items in a single ACH file before being transmitted over the ACH network.

The terms "financial transaction," "transaction," "ACH item," and "item" are used interchangeably herein to refer to any batched processed electronic payment or payment instruction, whether international or domestic. A "financial transaction" can also include information associated with a batched processed electronic payment or payment instruction. A payment or payment instruction therefor can be e.g., a credit, a debit, or a rejected or returned transaction. The terms "ACH file," "electronic file," and "file" are used interchangeably herein to refer to any collection of batched and/or unbatched ACH items. The term "financial institution" is generally used herein to refer to any person or entity that processes, creates, transmits, or receives data associated with a financial transaction.

The U.S. ACH network is being expanded for use with financial institutions in other countries. An International ACH links the U.S. ACH network to an ACH or comparable low-value, non-urgent payment system in countries outside the U.S. For outbound payments from the U.S. to a foreign country, an originating depository financial institution ("ODFI") can forward ACH files through a domestic gateway operator ("DGO"), or more specifically a U.S. gateway operator ("USGO"), and further through a foreign gateway operator ("FGO") in the country of the receiving depository financial institution ("RDFI"). For inbound payments to the U.S., a foreign financial institution can forward an ACH file or comparable file through an FGO to a USGO and on to a receiving financial institution in the U.S. The term "gateway operator" is generally used herein to refer to a financial institution that serves as a central clearing facility through which other financial institutions transmit or receive ACH items and/or ACH files. The gateway operator ("GO") passes the ACH files into or out of its domestic ACH or comparable payment system, and in some instances, performing any necessary reformatting of the ACH files. The GOs may send or receive ACH files in NACHA format or in other agreed formats such as ISO or SWIFT.

In general, ACH systems permit origination and settlement in the originating and receiving countries' domestic currencies. In an international transaction where the originating and receiving countries employ different currencies, a foreign exchange ("FX") conversion must take place.

Traditionally, the International ACH has only accommodated fixed to variable ("FV") payments. In FV credits outbound from the U.S., settlement is effected two times, the first by the USGO, which settles between the ODFI and the FGO, and the second by the FGO, which settles good funds to or from an account of the RDFI. In FV credit payments, a fixed amount of domestic currency is converted into whatever amount of the destination currency can be purchased when the FGO receives the ACH file, usually the banking day after the ODFI creates the ACH item. The term "create" is generally used herein to refer to generating a properly formatted ACH item, e.g., from information received by the ODFI from a customer. Until the FGO processes the ACH item—one or more banking days after item creation—the ODFI is unaware of the precise amount of foreign currency that will be credited to the RDFI.

Business contracts often require ODFIs to transmit specified, fixed amounts of foreign currency to RDFIs. Thus, a need exists in the art for a system and method of managing foreign credit payments, whereby ODFIs can specify predetermined foreign currency payment amounts.

SUMMARY OF THE INVENTION

The invention satisfies the above-described and other needs by providing systems and methods for efficiently transmitting messages related to low-value, non-urgent payments using a payment system, while completing settlement of the transaction identified in the message using a separate mechanism outside of the payment system. Specifically, the invention allows financial institutions to manage credit or debit payments of a fixed amount of foreign currency using the ACH network to transmit the necessary message information associated with the international payment. An ODFI can create a fixed to fixed foreign exchange ("F3X") message designating a fixed amount of foreign currency to be credited to an RDFI. Thus, upon creation of the F3X message, the ODFI determines the precise amount of foreign currency to be credited to the RDFI. Separate from the ACH network, the ODFI can complete the transfer of funds to the RDFI with a payment instruction sent directly to the FGO or to the FGO through a correspondent financial institution.

In one aspect of the invention, the ODFI can create a fixed to fixed credit or debit payment. In a fixed to fixed payment, payment of a fixed amount of foreign currency can be completed without the uncertainty caused by conversion based on a varying exchange rate. The ODFI can create F3X messages designating, in a foreign currency, payment amounts to be credited to an RDFI. The RDFI can be located in a foreign country. The ODFI can transmit the F3X messages in an ACH file to a first gateway operator, e.g., the USGO, via the ACH network. The USGO can transmit the F3X messages in the ACH file to a second gateway operator, e.g., the FGO.

In parallel, the ODFI can send a payment with file identifier information to the FGO. The payment typically is the total for the amounts indicated in all of the F3X messages in a file sent to the FGO. When the FGO receives the payment and file identifier information, it matches the information with the appropriate F3X message so that the payment can be properly routed to the RDFI in the foreign country.

In another embodiment of the invention, an operator of the ACH network can receive from an ODFI a file comprising an identifier and a plurality of F3X messages. Each of the F3X messages designates a payment amount in a foreign currency to be paid to a recipient's account at an RDFI in a foreign country. The ACH network operator unbundles the F3X messages from other domestic items in the ACH file. The ACH network operator can transmit the F3X messages and other cross-border items to a USGO for forwarding to an FGO. The FGO will match the F3X messages it receives from the USGO with payments it receives from ODFI. The FGO completes the matching process using identifiers associated with the F3X messages and with the payments.

In yet another embodiment, the USGO can receive F3X messages that are returned from the FGO or the RDFI because the payment could not be applied to the recipient's account. There may be a variety of reasons a payment cannot be applied to a recipient's account including: 1) the FGO is unable to match an F3X message with a payment; 2) the FGO does not receive a payment associated with an F3X message; or 3) the RDFI is unable to apply the payment because the account is not available. The USGO can unbundled the F3X messages from other items received from the FGO and batch the F3X messages based on the ODFI to which they will be returned. Once the F3X messages are placed in batches and ACH files, the USGO transmits the ACH files containing the returned F3X messages to the respective ODFIs via the ACH network.

In yet another embodiment, a system is provided that allows the completion of foreign payments using separate messaging and settlement components. The system includes an ODFI that can transmit F3X messages via an operator's ACH network to a USGO. The F3X messages are distinct from typical ACH items transmitted via the ACH network because the amount of domestic currency in the message is designated as zero and an alternate data field can be used to designate a payment amount in a foreign currency. The USGO receives the F3X messages and transmits them to the appropriate FGO for processing. In parallel, the ODFI transmits a payment order to the FGO and settles the amount of the payment order with the FGO. The payment order to the FGO will be associated with the F3X messages the FGO receives from the USGO by one or more unique identifiers. The FGO matches the payments it receives from the ODFI with the F3X messages received from the USGO in order to properly forward the payments to the RDFIs in the foreign country.

Additional aspects, features, and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

FIGS. 5A, 5B, and 5C illustrate the fields and data in an F3X message in accordance with an exemplary embodiment of the invention.

DETAILED DESCRIPTION OF EXEMPLARY EMBODIMENTS

The invention is directed to systems and methods for managing foreign payments using an international low-value, non-urgent electronic payment system or ACH network. While the term "ACH network" generally refers to an electronic payment system operated in U.S., in this patent application the term "ACH network" also encompasses any similar payment system used in other countries. In particular, the teachings herein are directed to managing fixed to fixed payments. The fixed to fixed payment is accomplished using two distinct conduits. First, the ACH network is used to transmit F3X messages identifying payment amounts in a foreign currency. The F3X messages are transmitted from the originating depository financial institution via the ACH network and a domestic gateway operator to a foreign gateway operator. Second, the originating depository financial institution transmits a payment order to the foreign gateway operator and the payment order is settled between the two entities. The foreign gateway operator matches the payment from the originating depository financial institution to the corresponding F3X messages so that the payment can be applied to the correct receiving depository financial institutions in the foreign country.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations in a distributed computing environment by conventional computer components, which can include database servers, application servers, mail servers, routers, security devices, firewalls, clients, workstations, memory storage devices, display devices and input devices. Each of these conventional distributed computing components is accessible via a communications network, such as a wide area network or local area network.

The invention comprises a computer network and computer programs that embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Figure 1:
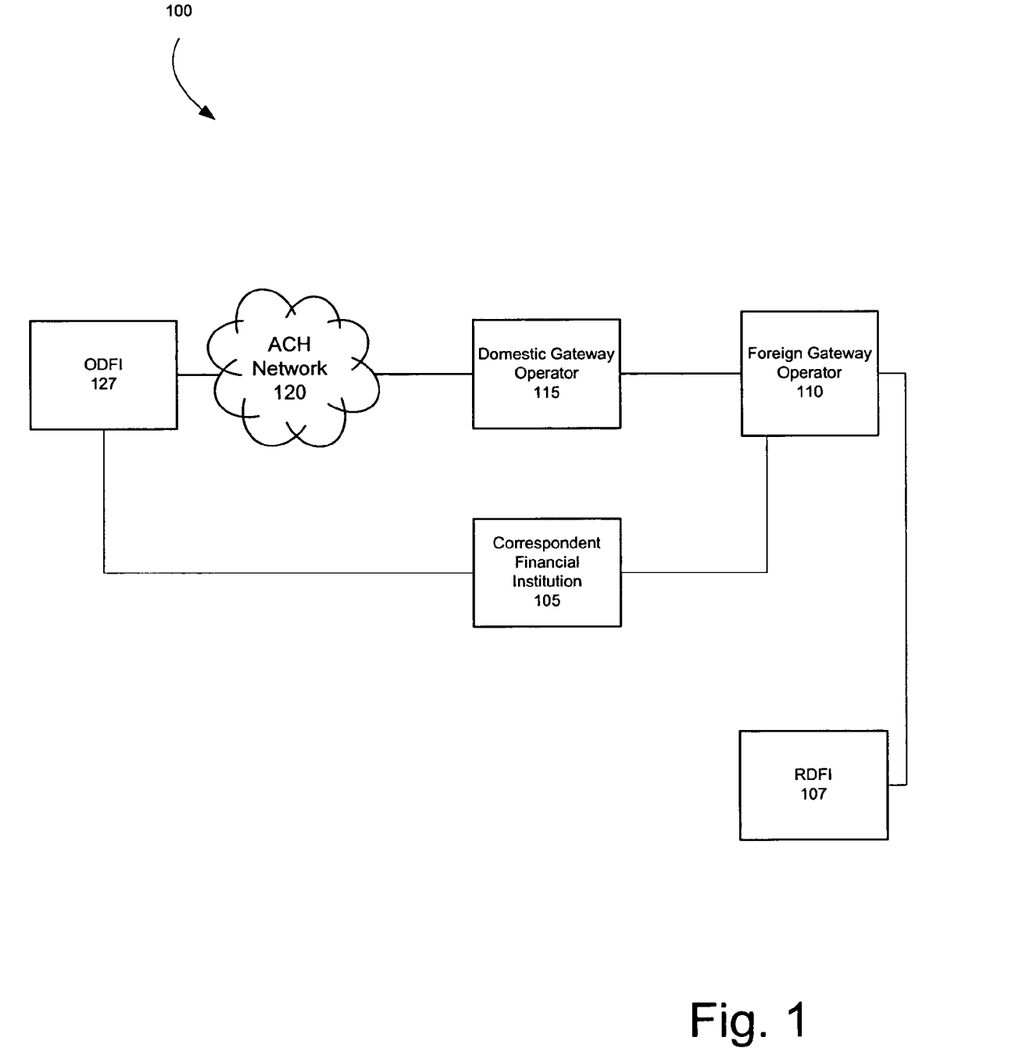
FIG. 1 is a block diagram illustrating an exemplary system for managing fixed to fixed payments in an International ACH, according to an exemplary embodiment of the invention.

Turning now to the drawings, in which like numerals indicate like elements throughout the figures, exemplary embodiments of the invention are described in detail. An exemplary system for processing foreign payments will now be described with reference to FIG. 1. FIG. 1 is a block diagram depicting an exemplary system 100 for processing fixed to fixed foreign payments. The exemplary system 100 comprises various financial institutions and computer systems involved in processing an international financial transaction. Although the description that follows of the exemplary system 100 refers to U.S. funds and foreign funds, it should be understood that the teachings can also be applied to credits or debits between other countries that do not involve the U.S.

The ODFI 127 can create one or more F3X messages, each of which identifies a payment to be made to a recipient account in a foreign currency. The F3X messages are distinct from conventional ACH items in that they do not involve a payment amount in U.S. funds and, therefore, the data fields within the F3X message that typically identify an amount of U.S. funds are zero. The only funds identified in the F3X message are the foreign currency amount. Furthermore, each batch of F3X messages is distinct in that it contains a unique identifier for use by an FGO.

Referring again to the exemplary system shown in FIG. 1, the ODFI 127 can collect the F3X messages in a batch and place the batch within an ACH file for transmitting to an operator of the ACH network 120. The operators of the ACH network 120 are not shown in FIG. 1, but generally consist of financial institutions that manage the ACH network 120 and the flow of files within the network. The ACH file the ODFI 127 transmits to the ACH network operator can also include batches of other ACH items.

Upon receipt of the ACH file within the ACH network 120, an ACH operator can unbundle from the ACH file the F3X messages and other cross-border ACH items. The ACH operator can transmit the F3X messages to the domestic gateway operator ("DGO") 115 for processing. Based on the location of the RDFI 107, the DGO 115 can determine the appropriate FGO 110 to receive the F3X messages and cross-border ACH items. While the exemplary system shown in FIG. 1 only illustrates one ODFI 127, one DGO 115, one FGO 110 and one RDFI 107, it should be understood that multiple financial institutions and gateway operators may be involved in the application of the invention. For example, if the RDFI 107 is located in Japan, the DGO 115 can determine to transmit the F3X messages to a Japanese FGO 110. Depending on the location of each RDFI 107, the DGO 115 can transmit F3X messages to different FGOs. For example, if a first F3X message is destined for a Japanese RDFI and a second F3X message is destined for a European RDFI, the DGO 115 can transmit the first F3X message to a Japanese FGO and the second F3X message to a European FGO.

Separate from the F3X messages transmitted via the ACH network, the ODFI settles payment of the amounts identified in the F3X messages outside of the ACH network. In the embodiment illustrated in FIG. 1, the ODFI 127 can transmit a payment order to correspondent bank 105. The correspondent bank 105 is typically a financial institution located in the same country as the FGO 110 and the RDFI 107. The payment order from the ODFI 127 to the correspondent bank 105 may take one of many forms including a written instruction to move funds to or from an account or a wire transfer of funds. The ODFI 127 will also associate with the payment order a unique identifier that was also included in the F3X messages corresponding to the payment order.

Once the correspondent bank 105 receives funds from the ODFI 127, it will forward the payment order with the unique identifier to the FGO 110 and settle the amount of the payment order with the FGO 110. Using the unique identifier, the FGO 110 will be able to match the amount of the payment order with the corresponding F3X messages received via the ACH network 120 and the DGO 115. Assuming the FGO 110 is able to make a correct match, it will then forward the F3X messages to the appropriate RDFI 107 and credit the RDFI 107 the appropriate amount of funds identified in the F3X message.

In an alternate embodiment to that shown in FIG. 1, the ODFI 127 can complete the same transaction without a correspondent bank 105. Instead of transacting with the correspondent bank 105, the ODFI 127 can have an account with the FGO 110 enabling a direct transaction without the correspondent bank 105. In this alternate embodiment, the ODFI 127 can send a payment instruction with the unique identifier directly to the FGO 110. Because the ODFI 127 has an account with the FGO 111, the FGO 111 is able to move funds totaling the amount of the payment order directly from the ODFI's account. The FGO 111 can match the funds moved from the ODFI's account with the appropriate RDFIs based on the F3X messages corresponding to the payment order.

Those skilled in the art will appreciate that exemplary system 100 is merely representative of the components for managing fixed to fixed payments using an ACH network for messaging. Other embodiments of the invention may not have all of the components identified in FIG. 1 or can include other components. Furthermore, the embodiments described in this specification relate to a payment made from and ODFI in the U.S. to a foreign RDFI. It will be apparent to those skilled in the art that the methods and systems described herein can be modified to permit a fixed to fixed payment from a foreign financial institution to a U.S. financial institution or to a financial institution in a third country.

Figure 2A:
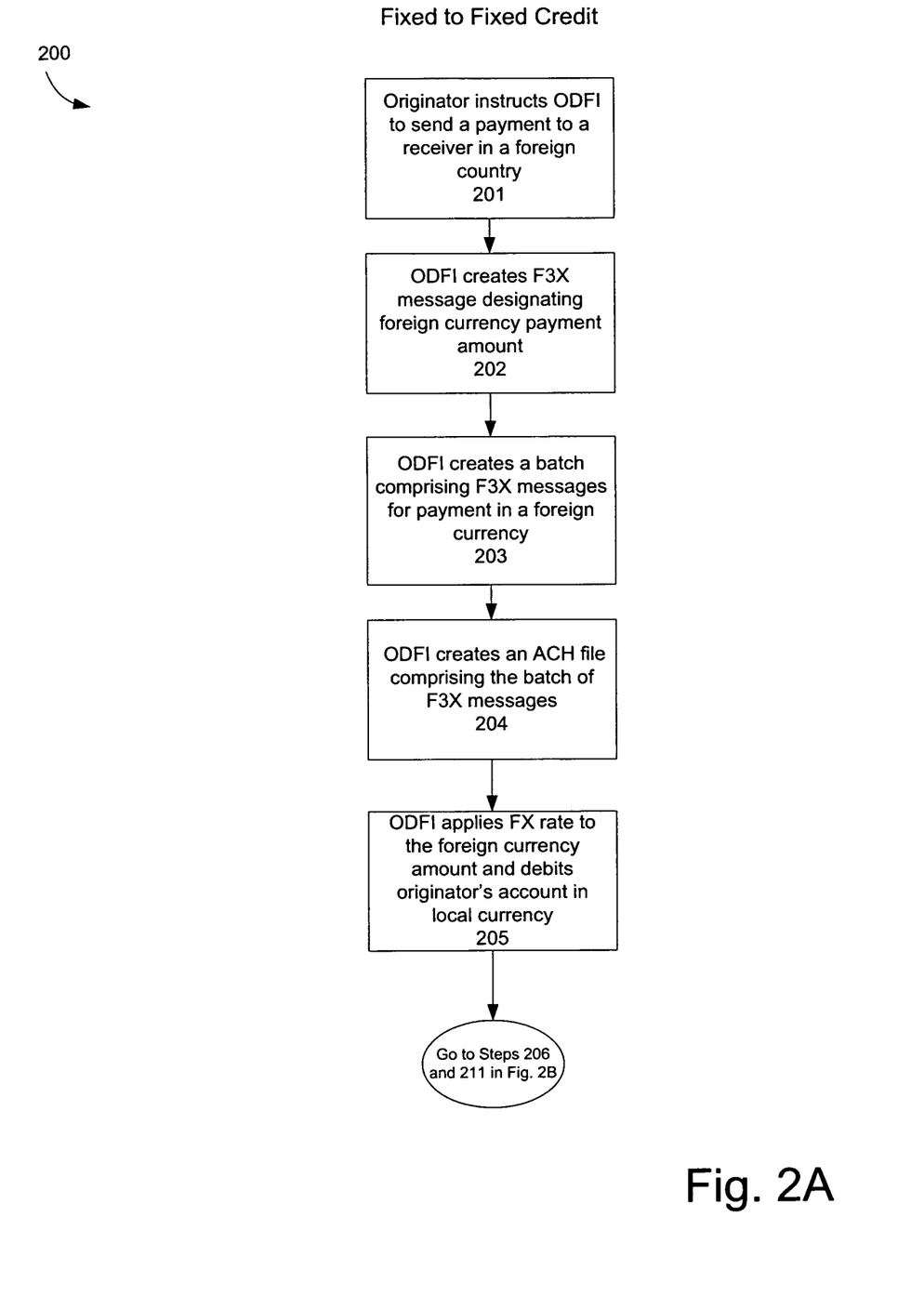
FIGS. 2A, 2B, and 2C are flow chart diagrams illustrating a method for managing fixed to fixed credit payments using an International ACH, according to an exemplary embodiment of the invention.
Figure 2B:
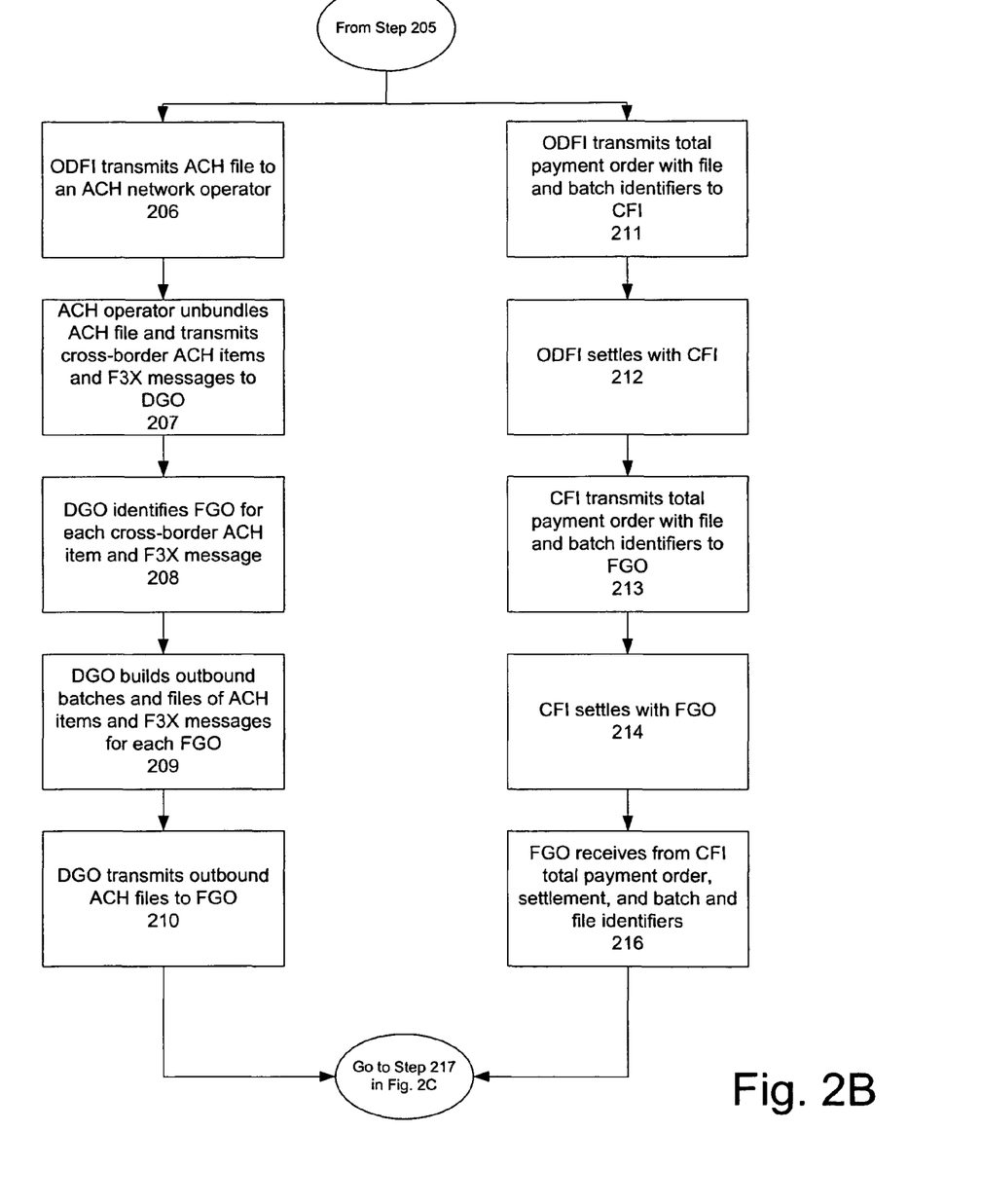
Figure 2C:
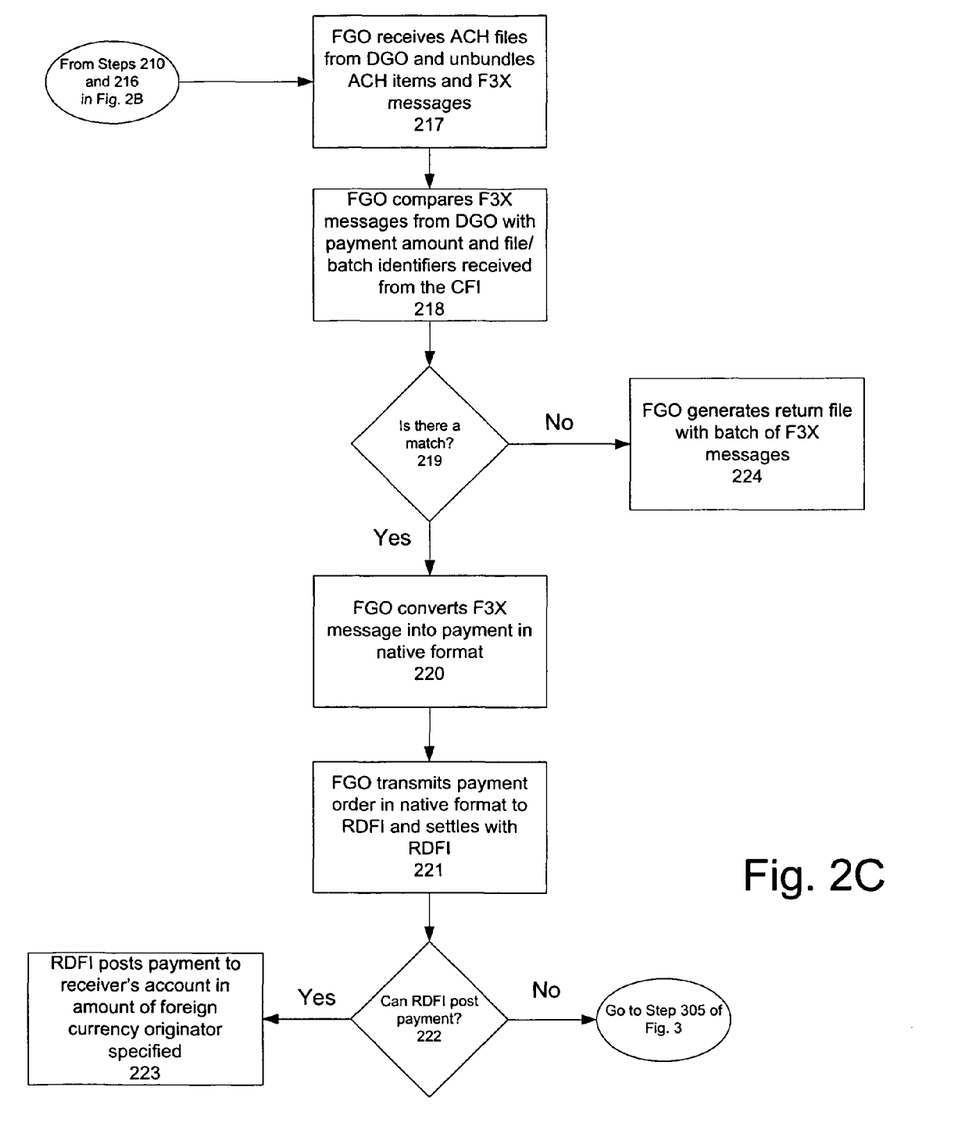

FIG. 2 is a flow chart diagram illustrating a method 200 for managing fixed to fixed credit payments using an ACH network, according to an exemplary embodiment of the invention. The exemplary method 200 is merely illustrative and, in alternative embodiments of the invention, the payment may be a debit, certain steps can be performed in a different order, in parallel with one another, certain steps can be omitted entirely, and/or certain additional steps can be performed.

In step 201, an originator, such as an account holder at an ODFI 127, instructs the ODFI to send a payment to a recipient in a foreign country. The instruction includes the amount of the payment in the foreign currency. In step 202, the ODFI 127 creates an F3X message reflecting the originator's instruction. Unlike a typical ACH item, the F3X message does not contain a credit amount in the domestic currency. The F3X message is unique in that the credit amount in the domestic currency is designated to be zero and only the amount of the payment in the foreign currency is included in the message. The ODFI 127 creates a batch consisting of F3X messages for payment in a foreign country in step 203 of exemplary process 200. The batch of F3X messages can be placed in an ACH file alone or with other batches of ACH items in step 204. While the ACH file can comprise batches of varying types, in the preferred embodiment, F3X messages and ACH items are not mixed within a batch.

The ODFI 127 completes the initial processing of the foreign payment in step 205 by applying a foreign exchange rate to the amount of foreign currency specified in the F3X message. The amount of domestic currency calculated using the foreign exchange rate is debited from the originator's account at the ODFI 127.

Turning to step 206, the ODFI 127 transmits the ACH file comprising the F3X messages to an operator of the ACH network 120. While the ACH operator is not illustrated in FIG. 1, the ACH network 120 is managed by one or more financial institutions that can be generally referred to as the ACH operator. The ACH operator unbundles the batches in the ACH file to separate foreign and domestic related information in the file. Messages and items relating for foreign transactions are forwarded to a domestic gateway operator (within the U.S., a U.S. gateway operator) which communicates with foreign financial institutions. In step 207 of exemplary process 200, the ACH operator unbundles ACH items and F3X messages from the ACH file and transmits the cross-border messages and items to the domestic gateway operator.

The DGO 115 typically is another financial institution that manages transactions with foreign financial systems and institutions. In step 208, the DGO 115 examines each ACH item and F3X message it receives from the ACH network 120 and determines which is the appropriate FGO 110 for receipt of the item or message. Based on its determination as to the appropriate FGO 110, the DGO 115 builds batches and files of ACH items and F3X messages for transmitting to the FGO 110 in step 209. As with the domestic ACH files, in the preferred embodiment, F3X messages are not commingled in batches with ACH items. Once an outbound file has been constructed with ACH items and F3X messages, the DGO 115 transmits the file to the FGO 110 in step 210.

Steps 207 through 210 describe processes going on within the ACH network 120 and between the financial institutions coupled to that network. As shown in FIG. 2, while exemplary steps 207 through 210 are proceeding, a parallel process is taking place between the ODFI 127 and the FGO 110 which occurs outside the ACH network 120. An example of this parallel process is illustrated in steps 211 through 216 of FIG. 2B. While this invention does not require that the steps of these two processes occur in parallel or be synchronized, in the preferred embodiment, these two processes occur in parallel and are completed within a window of time predetermined by the financial institutions.

Referring to steps 211 through 216, an exemplary process is shown for completing a settlement of funds between the ODFI 127 and the FGO 110. The exemplary process shown in steps 211 through 216 actually includes two alternatives which will be explained in greater detail. In step 211, the ODFI 127 transmits a payment order for the total of the amounts designated in the batch of F3X messages transmitted via the ACH network 120. The unique file and batch identifiers for the F3X messages are also included with the payment order the ODFI 127 sends to the correspondent financial institution 105. In alternate embodiments of the invention, a single unique identifier can be used to identify the F3X messages corresponding to the payment order. In step 212, the ODFI 127 settles with the correspondent financial institution 212 via a wire transfer or other means of transferring funds.

The second leg of the settlement takes place in step 213 between the CFI 105 and the FGO 110. First, the CFI 105 transmits the payment order for the total amount of the F3X messages in the batch and the file and batch identifiers to the FGO 110. The CFI completes the settlement with the FGO in step 214 when funds are transferred to the FGO via an account with the FGO or other means for moving funds. Upon completion of the settlement process with the FGO 110 in step 216, the FGO will have received the total payment order, the funds, and the batch and file identifiers corresponding to the identifiers in the F3X messages.

As mentioned previously, in an alternate embodiment of the invention, the settlement process illustrated in steps 211 through 216 can also be completed without a CFI 105. In this alternate embodiment, the ODFI 127 typically has an account with the FGO 110 and communicates the payment order and batch and file identifiers directly to the FGO 110. When the FGO 110 receives the payment order from the ODFI 127, it can transfer the amount designated in the payment order from the ODFI's account at the FGO 110.

The final portion of the international transaction is illustrated in steps 217 through 224 shown in FIG. 2C. Once the two parallel processes shown in FIG. 2B are completed, the exemplary process 200 moves to steps 217 through 224. In step 217, the FGO 110 receives the ACH file from the DGO 115 and unbundles the ACH items and F3X messages. Using the batch and file identifiers transmitted with the payment order, the FGO 110 can compare the payment to the F3X messages in step 218 to determine whether the correct amount of finds has been received. If the FGO 110 is unable to match the batch of F3X messages with a payment in step 219, the FGO 110 can generate a return file with the batch of F3X messages for returning to the DGO in step 224. An exemplary return process relating to a return from an RDFI is illustrated in FIG. 3 and the associated discussion set forth below.

Assuming the FGO 110 is able to match the F3X messages in the batch with a payment in step 219, the FGO 110 will proceed with the processing of the F3X messages in step 220 by converting them to payment instructions in the file format used among the FGO 110 and the foreign financial institutions in the particular country. The FGO 110 will transmit payment instructions in the appropriate file format to the RDFIs in the foreign country in step 221. The FGO 110 will also complete settlement of funds with the RDFI in connection with step 221.

Once the RDFI 107 receives the payment instruction from the FGO 110, the RDFI 107 must determine whether it can properly post the payment to a recipient's account. If the RDFI 107 is able to post the payment, the RDFI credits the recipient's account in step 223 for the amount of the foreign currency originally specified in the originator's payment instruction. Alternatively, if in step 222 the RDFI is unable to post the payment to a recipient's account, the RDFI will return the payment. The RDFI may not be able to post the payment to an account for a variety of reasons such as the account having been closed or if the wrong account information was transmitted by the ODFI. An exemplary process for returning a payment is illustrated in FIG. 3.

Figure 3:
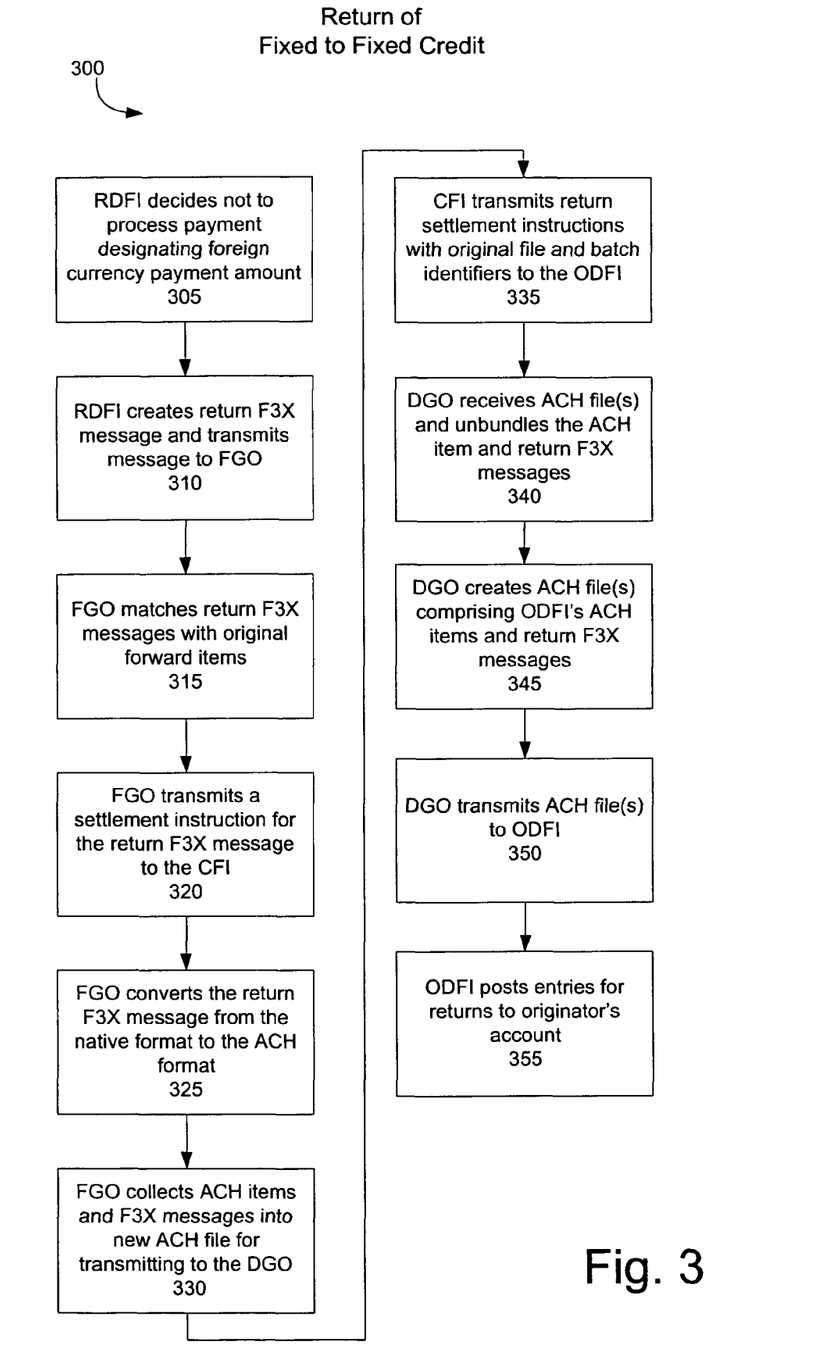
FIG. 3 is a flow chart diagram illustrating a method for managing a return of a fixed to fixed credit payment in an International ACH, according to an exemplary embodiment of the invention.

Turning to FIG. 3, exemplary process 300 describes the steps involved in returning a fixed to fixed credit from a foreign financial institution. The exemplary method 300 is merely illustrative and, in alternative embodiments of the invention, certain steps can be performed in a different order, in parallel with one another, certain steps can be omitted entirely, and/or certain additional steps can be performed. In addition, the exemplary return process 300 may be modified when the reason for the return varies or when the return process begins with the FGO 110 instead of the RDFI 107.

In step 305, the RDFI 107 determines not to process a payment designating a foreign currency payment amount. In step 310, RDFI 107 creates a return F3X message for the unposted payment and transmits the message to the FGO 110. The FGO 110 receives the return F3X messages in step 315 and matches them with the original F3X messages received from the DGO 115. In order to reverse the settlement of the funds relating to the return F3X message, the FGO 110 transmits a settlement instruction for the return F3X message to the correspondent financial institution 105 in step 320.

To complete the transmission of the return F3X message, the FGO 325 first converts the return F3X message in step 325 from the format used in the foreign country to the ACH format used for the original F3X message. In step 330 the FGO 110 collects the return F3X messages and other ACH items into a new ACH file for transmitting to the DGO 115. Steps 325 and 330 complete the FGO's handling of the return F3X message.

Turning to the activities in the U.S. to complete the return process, the correspondent financial institution 105 transmits return settlement instructions with the original file and batch identifiers to the ODFI 127 in step 335. The original file and batch identifiers will enable the ODFI 127 to locate the original F3X message and properly credit the originator's account. With respect to the return F3X message, the DGO 115 receives the ACH file from the FGO 110 in step 340 and unbundles the ACH items and return F3X messages so that they can be properly routed to originating financial institutions. In step 345, the DGO 115 creates an ACH file comprising ACH items and return F3X messages destined for ODFI 127 and in step 350 the DGO 115 transmits the new ACH file to the ODFI 127 via the ACH network 120.

Upon receipt of the return F3X message in the ACH file received from the DGO 115, the ODFI 127 can match the return F3X message to the original F3X message and the funds returned from the correspondent financial institution 105. In step 355, the ODFI 127 posts the returned funds to the originator's account to complete the return process.

Figure 4:
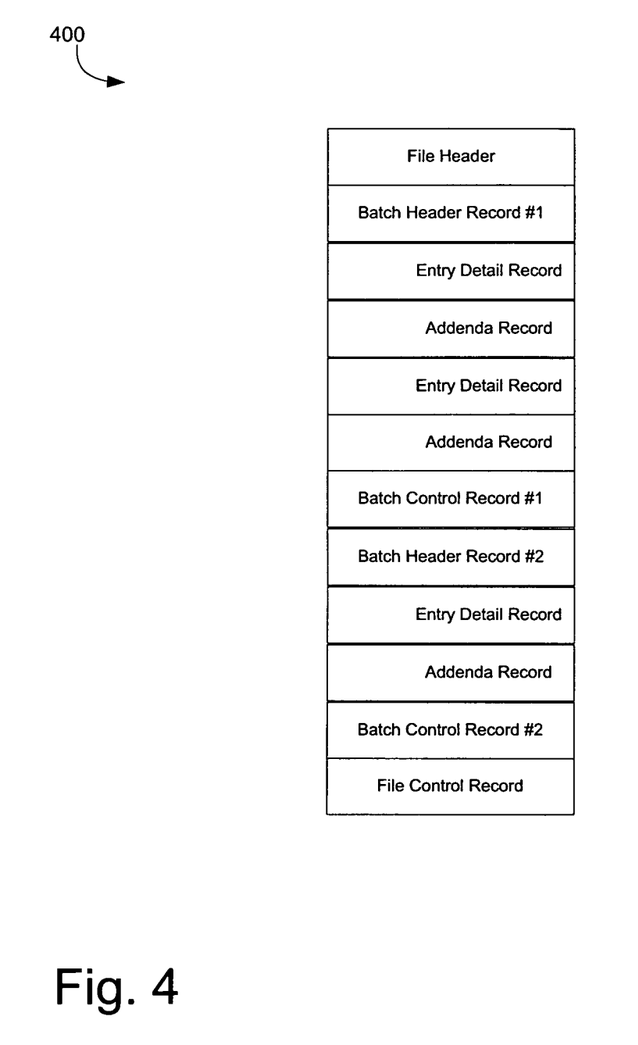
FIG. 4 is a block diagram illustrating an ACH file structure in accordance with an exemplary embodiment of the invention.

Turning to FIG. 4, an exemplary structure for an ACH file is illustrated. The ACH system in the U.S. employs the NACHA format illustrated in exemplary file structure 400. Payment systems in other countries use other types of standard file structures, such as ISO or SWIFT formats, which may or may not include batches of items and messages. The NACHA file format was designed to contain transaction records for numerous transactions that could be processed in a batch processing approach. However, the NACHA file format is not limited to a batch processing approach with multiple items and multiple batches. For example, the ACH file 400 can include only a single item or message.

Figure 5C:
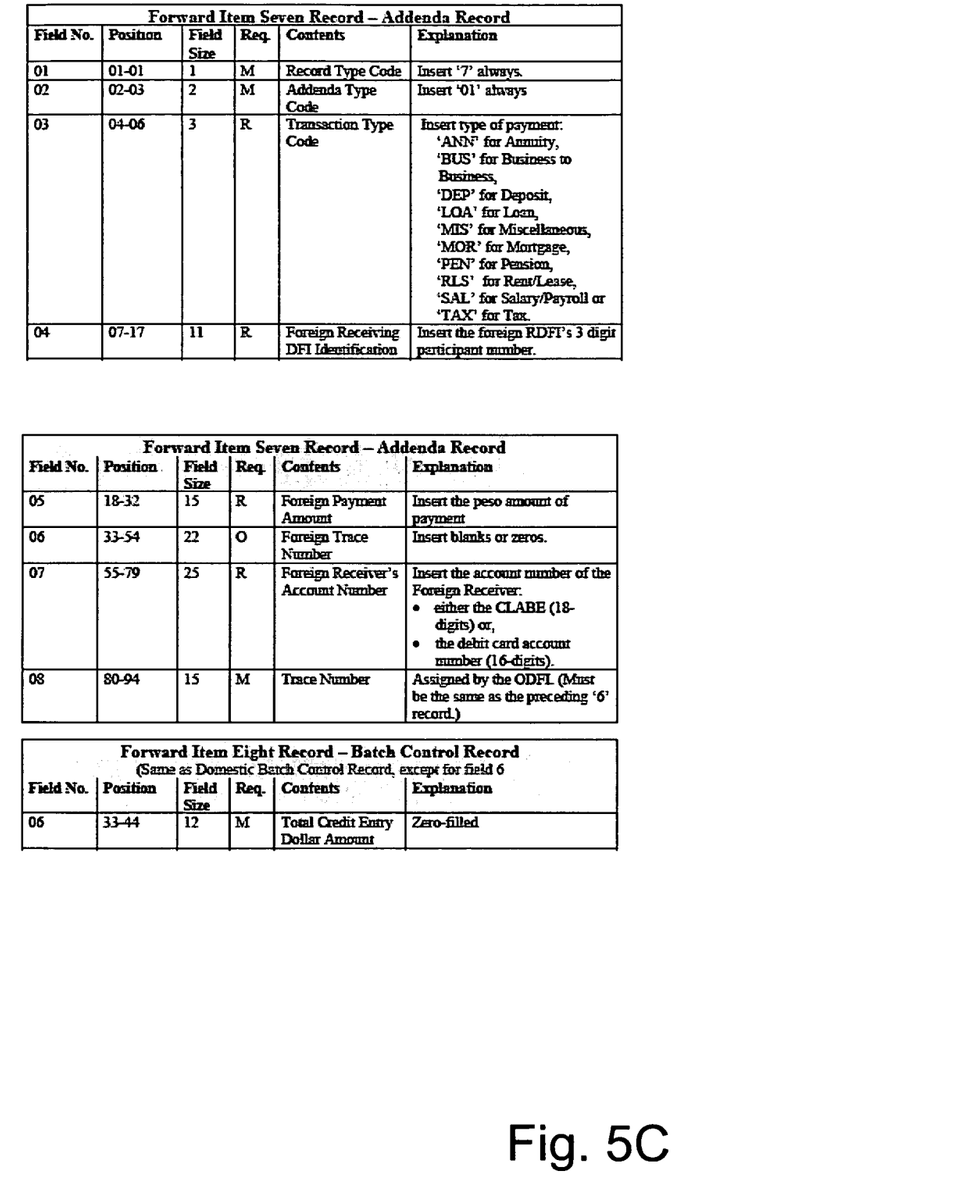

The exemplary NACHA file structure 400 includes a file header comprising information applicable to all of the batches of items and messages within the file. For example, the file header can include an amount that is the sum of all of the transaction items and messages contained within the file. Within the file are one or more batches, each of which comprises header, entry detail, addenda, and control records. Examples of the types of information stored in each of these records within a batch is illustrated in greater detail in connection with FIGS. 5A through 5C. It should be understood that the file formats illustrated in FIGS. 5A through 5C are merely examples and that other arrangements or formats may be used in other systems.

Referring to FIG. 5A, a table illustrating the structure and types of information typically found within the batch header record is set forth. The batch header record typically contains information identifying the destination country, such as "MX" for Mexico, and the type of currency for the items or messages within the batch, such as "M×N" for Mexican pesos. In the context of an F3X message, the batch header record can also contain an indicator of the type of transaction, such as "FF" for fixed to fixed. The unique identifier for the F3X messages in the batch can also be included, for example, in the "Company Entry Description" field of the batch header record.

The entry detail record of the batch includes the amount of the transaction in U.S. currency. As shown in FIG. 5B, in the context of an F3X message, the U.S. currency amount is zero because no U.S. funds are being settled through the ACH network.

The addenda record within a batch generally includes information identifying the foreign receiving account and institution and the amount to be paid in the foreign currency. In the exemplary tables shown in FIG. 5C for an F3X message, the amount of the payment in the foreign currency is included in the addenda record.

FIG. 5C also shows an exemplary control record for an F3X message. For a typical ACH item, the control record includes the total amount of U.S. funds that are being credited. However, in the context of an F3X message, the amount of U.S. funds being credited is zero.

The file formats illustrated in FIGS. 4 and 5A through 5C are merely one means for accomplishing the conversion process and those skilled in the art will recognize that other file formats can readily be adopted to accomplish the conversion process described herein.

In conclusion, the invention, as represented in the foregoing exemplary embodiments, provides systems and methods for managing foreign payments using an International ACH to accomplish the transmission of messages and an alternate mechanism to complete the settlement of payments. An ODFI can create a unique message that designates a fixed amount of foreign currency to be credited to an RDFI. The message is transmitted to a domestic gateway operator via an ACH network operator. The domestic gateway operator can transmit the message to an FGO. In parallel with the transmission of the message, the ODFI can transmit directly to the FGO a payment instruction to pay the amount designated in the message. Identifying information included with the payment instruction allows the FGO to match the message with the payment amount before transmitting the payment to the RDFI.

It will be appreciated that the exemplary embodiments of the invention overcome the limitations of the prior art. From the description of the exemplary embodiments, equivalents of the elements shown therein and ways of constructing other embodiments of the invention will be apparent to practitioners of the art. For example, electronic payment systems other than the ones described herein can also be adapted to perform the inventive processes described and claimed in this application. Similarly, while representative file structures that can be used to accomplish the messaging step are described and illustrated, other types of electronic messaging and files can also be used to execute the invention. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. A computer-implemented method for managing a foreign payment using an automated clearinghouse ("ACH") network comprising the steps of:

creating at an originating depository financial institution a file comprising a plurality of F3X messages, each of the F3X messages designating a payment amount in a foreign currency and designating a zero value for a domestic currency, the F3X messages to be transmitted from the originating depository financial institution to a receiving depository financial institution located in a foreign country;

transmitting the file comprising the plurality of F3X messages from the originating depository financial institution via the ACH network to a domestic gateway operator for forwarding to a foreign gateway operator;

transmitting a payment order from the originating depository financial institution for a total amount of foreign currency, the total amount of foreign currency equal to the sum of the payment amounts in the file comprising the F3X messages, the payment order transmitted outside the ACH network to the foreign gateway operator; and transmitting a file identifier corresponding to the file comprising the F3X messages, wherein the file identifier is transmitted from the originating depository financial institution outside the ACH network to the foreign gateway operator, the file identifier enabling the foreign gateway operator to match the F3X messages to the payment order so that the payment amounts can be credited to the receiving depository financial institution.

2. The computer-implemented method of claim 1, wherein the file further comprises ACH items.

3. The computer-implemented method of claim 1, further comprising the steps of:

applying an exchange rate to one of the foreign currency payment amounts in one of the F3X messages to calculate a payment amount in a domestic currency; and debiting at the originating depository financial institution the payment amount in the domestic currency from an origination account.

4. The computer-implemented method of claim 1, wherein the domestic gateway operator identifies the foreign gateway operator from information within the file.

5. The computer-implemented method of claim 1, wherein the payment order transmitted from the originating depository financial institution to the foreign gateway operator is transmitted via a correspondent financial institution.

6. The computer-implemented method of claim 1, further comprising the step of settling the payment order from the originating depository financial institution to the foreign gateway operator by posting the amount of the payment order to an account held at the foreign receiving gateway operator.

7. A computer-implemented method for managing a foreign payment using an automated clearinghouse ("ACH") network comprising the steps of:

receiving at an ACH operator from an originating depository financial institution a file comprising an identifier and a plurality of F3X messages, each of the F3X messages designating a payment amount in a foreign currency and designating a zero value for a domestic currency, the F3X messages to be transmitted from the originating depository institution to a receiving depository financial institution located in a foreign country;

unbundling the F3X messages from domestic ACH items within the file; and transmitting the F3X messages and the identifier to a domestic gateway operator for forwarding to a foreign gateway operator, wherein the foreign gateway operator uses the identifier to match the F3X messages with a payment order transmitted from the originating depository financial institution outside the ACH network and to the foreign gateway operator, wherein the foreign gateway operator transmits the payment amounts identified in the F3X messages to the receiving depository financial institution.

8. The computer-implemented method of claim 7, wherein the file further comprises ACH items.

9. The computer-implemented method of claim 7, wherein the foreign gateway operator converts the F3X messages to a foreign format.

10. The computer-implemented method of claim 7, wherein the originating depository financial institution applies an exchange rate to the payment amounts in the F3X messages in order to calculate a payment amount in a domestic currency for each of the F3X messages.

11. The computer-implemented method of claim 7, wherein the domestic gateway operator identifies the foreign gateway operator from information within the F3X messages.

12. The computer-implemented method of claim 7, wherein the foreign gateway operator creates return F3X messages for the F3X messages that do not match a payment.

13. The computer-implemented method of claim 12, wherein the foreign gateway operator transmits return F3X messages to the domestic gateway operator for forwarding to the originating depository financial institution.

14. A computer-implemented method for managing a return of a foreign payment using an automated clearinghouse ("ACH") network comprising the steps of:

receiving at a domestic gateway operator from a foreign gateway operator a first file comprising ACH items and return F3X messages, wherein the return F3X messages comprise an identifier, a zero value for a domestic currency, and payment amounts that were intended for but not applied to an account at a receiving depository financial institution;

unbundling the ACH items and the return F3X messages from the first file;

bundling in a second file return F3X messages and ACH items that identify a common originating depository financial institution; and transmitting the second file from the domestic gateway operator to the originating depository financial institution via the ACH network.

15. The computer-implemented method of claim 14, wherein the originating depository financial institution matches the file identifiers in the return F3X messages with payments returned to the originating depository financial institution from the foreign gateway operator.

16. The computer-implemented method of claim 14, wherein the foreign gateway operator is unable to match the F3X message with a payment.

17. The computer-implemented method of claim 14, wherein the receiving depository financial institution is unable to apply payments associated with the F3X messages to an account.

18. The computer-implemented method of claim 14, wherein the foreign gateway operator transmits a settlement instruction to the originating depository financial institution for the payment amounts identified in the return F3X messages.

19. A system for managing a foreign payment using an automated clearinghouse ("ACH") network comprising:

a domestic gateway operator receiving F3X messages from an originating depository financial institution, the F3X messages designating payment amounts in a foreign currency, designating zero values for a domestic currency, and designating an identifier associated with the F3X messages, the domestic gateway operator transmitting the F3X messages with the payment amounts and the identifier to a foreign gateway operator;

the ACH network providing the F3X messages from an originating depository financial institution to the domestic gateway operator; and a foreign gateway operator receiving the F3X messages from the domestic gateway operator and receiving the identifier and a settlement corresponding to the F3X messages from the originating depository financial institution, the identifier and the settlement transmitted from the originating depository financial institution outside the ACH network to the foreign gateway operator.

20. The system of claim 19, wherein the foreign gateway operator receives the settlement and the identifier via a correspondent financial institution.

21. The system of claim 19, wherein the foreign gateway operator matches the settlement and the F3X messages using the identifier.

22. The system of claim 19, wherein the foreign gateway operator converts the F3X messages to a payment instruction in a foreign format.

* * * * *